Patented May 5, 1953

2,637,726

UNITED STATES PATENT OFFICE 2,637,726

RECOVERY OF CEREBROSIDES

Robert H. Sifferd, Joliet, Ill., assignor to Armour and Company, Chicago, Ill., a corporation of Illinois No Drawing. Application November 2, 1951, Serial No. 254,658

6 Claims. (Cl. 260—210)

This invention relates to the recovery of cerebrosides from nerve tissues. The invention is particularly useful in the separation of cerebrosides from an aqueous solution containing cerebrosides and impurities obtained after nerve tissues have been extracted with ethylene dichloride.

An object of the invention is to provide a process for the recovery of the cerebrosides from nerve tissues while separating the cerebrosides from the impurities. Another object is to provide a process in which nerve tissues are extracted with ethylene dichloride and the aqueous layer obtained further extracted at elevated temperatures with ethylene dichloride for the recovery of cerebrosides within the ethylene dichloride layer or phase. A still further object is to provide a process for the treatment of nerve tissues through which cerebrosides are selectively dissolved within ethylene dichloride maintained at an elevated temperature and being readily recovered from the ethylene dichloride by cooling or other steps. Other specific objects and advantages will appear as the specification proceeds.

In one embodiment of my invention, animal nerve tissue, such as brain and spinal cord, is extracted in the presence of water with ethylene dichloride. Upon standing, the material separates into an ethylene dichloride phase or layer containing cholesterol, and an aqueous phase or layer containing cerebrosides and other impurities. After separating the aqueous layer and adding thereto ethylene dichloride, the material is heated to an elevated temperature to cause the cerebrosides to be dissolved within the ethylene dichloride while the impurities remain in the water layer or phase. The cerebrosides may then be recovered from the ethylene dichloride by cooling, concentrating, or other suitable means. Upon cooling, the cerebrosides cool as a waxy body on the top of the liquid and may be skimmed off.

The process, in a more specific form, may be described as follows: Nerve tissue, such as brain or spinal cord, which contains cerebrosides (compound lipids) and cholesterol, is treated with ethylene dichloride and water. After agitation and separation of the two resulting layers, the ethylene dichloride layer is found to contain the cholesterol, while the aqueous layer is found to contain the cerebrosides together with all the other impurities which were originally in the nerve tissue. This extraction is repeated twice more and the aqueous layer, containing the cerebrosides and the other impurities, is subjected to a further extraction with ethylene dichloride and water. At this time, however, the temperature is gradually raised to an elevated point (say about 170° F.) and the material is allowed to settle into two layers. The cerebrosides apparently pass into the ethylene dichloride layer, while the other impurities remain in the aqueous layer. If the two layers are separated while hot and then allowed to cool, the cerebrosides may be recovered as a solid material from the ethylene dichloride.

The temperature to which the aqueous layer with the added ethylene dichloride has to be raised in order to cause the cerebrosides to enter the ethylene dichloride layer will vary depending upon the material being treated. I prefer to elevate the temperature to about 170° F., but good results will be obtained when the temperature is within 140° to 175° F.

Specific examples of the process may be set out as follows:

*Example 1*

100 lbs. of fresh spinal cord is finely hashed and extracted by agitation with about 30 gallons of ethylene dichloride for about two hours. The mixture is then allowed to stand for about 30 minutes, during which insoluble material separates and the ethylene dichloride layer is drawn off. The tissue residue may be reextracted with about 20 gallons of ethylene dichloride in the same manner, and the extract drawn off as before. I prefer to extract the remaining tissue residue again with about the same quantity of ethylene dichloride and to recover the extract. The aqueous material remaining after said extracts are removed is extracted a fourth time with ethylene dichloride, the material being agitated and gradually heated to 170° F. within two hours. The material is allowed to settle for two hours, and the clear layer is then drawn off and filtered while hot through a jacketed press. The filtered liquid may either be rapidly cooled or allowed to come to room temperature by holding over night. The wax layer on the surface of the ethylene dichloride is skimmed off and dried in vacuo.

*Example 2*

Beef spinal cord and brain tissue is finely hashed and extracted by agitation with ethylene dichloride and allowed to stand, separating into an aqueous layer and an ethylene dichloride layer. 3,000 lbs. of the aqueous layer (or residue), containing over 10% moisture, was extracted with 600 gallons of ethylene dichloride. The material was agitated and gradually heated to 170° F. within two hours. The material was allowed to settle for two hours and then the clear layer (ethylene dichloride) was drawn off and filtered while hot through a jacketed press. When the liquid reached room temperature, a wax layer on the surface thereof was skimmed off and dried in vacuo. This layer consisted of cerebrosides and the yield was 300 lbs.

*Example 3*

The process was carried on as described in Example 2 except that the temperature to which the aqueous layer containing added ethylene dichloride was raised was 142° F.

*Example 4*

The process was carried out as described in Example 3 except that the aqueous layer and the added ethylene dichloride was heated to approximately 175° F. before the material was allowed to settle.

While in the foregoing specification, I have set forth a specific process in considerable detail for the purpose of illustrating an embodiment of the invention, it will be understood that such details of operation may be varied widely by those skilled in the art without departing from the spirit of my invention.

I claim:

1. In a process for treating nerve tissue to isolate cerebrosides, the steps of extracting said nerve tissue with ethylene dichloride to produce an aqueous layer and an ethylene dichloride layer, separating the aqueous layer and adding thereto ethylene dichloride, heating the aqueous and ethylene dichloride mixture above 140° F. to cause the cerebrosides to enter the ethylene dichloride layer, and separating the ethylene dichloride layer and the cerebrosides therefrom.

2. In a process for treating nerve tissue to isolate cerebrosides, the steps of extracting said nerve tissue with ethylene dichloride at room temperature and allowing the material to settle to form an aqueous layer and an ethylene dichloride layer, separating the aqueous layer, adding to the aqueous layer ethylene dichloride, heating the aqueous layer with the ethylene dichloride to a temperature above 140° F. to cause the cerebrosides to enter the ethylene dichloride phase allowing the material to cool, and separating the cerebrosides from the ethylene dichloride layer.

3. The process of claim 2, in which the final ethylene dichloride layer is cooled and the cerebrosides separated as solids from the ethylene dichloride.

4. In a process for treating nerve tissue to isolate cerebrosides, in which process nerve tissue is extracted with ethylene dichloride and an ethylene dichloride layer formed containing cholesterol and an aqueous layer formed containing cerebrosides and impurities, the steps of separating the aqueous phase, adding thereto ethylene dichloride, heating the resulting mixture to a temperature of about 170° F., allowing the material to cool into an ethylene dichloride layer and an aqueous layer, and separating the ethylene dichloride layer and the cerebrosides therefrom.

5. The process of claim 4, in which the mixture is agitated and the temperature raised gradually to about 170° F.

6. In a process for treating nerve tissue to isolate cerebrosides, in which process nerve tissue is extracted with ethylene dichloride and an ethylene dichloride layer formed containing cholesterol and an aqueous layer formed containing cerebrosides and impurities, the steps of separating the aqueous phase, adding thereto ethylene dichloride, heating the resulting mixture to a temperature of about 170° F., allowing the material to cool to form, an ethylene dichloride layer and an aqueous layer, and skimming the cerebrosides as a waxy solid from the top of the final ethylene dichloride layer.

ROBERT H. SIFFERD.

References Cited in the file of this patent

UNITED STATES PATENTS

| Number | Name | Date |
|---|---|---|
| 2,371,467 | Porsche | Mar. 13, 1945 |

OTHER REFERENCES

Carter et al., Jour. Biol. Chem., pages 77–82, June 1947.